July 5, 1949.　　　　　D. D. BAKER　　　　　2,475,305
APPARATUS FOR WRAPPING FISHING RODS AND THE LIKE
Filed March 26, 1947　　　　　　　　　　　2 Sheets-Sheet 1

INVENTOR
Dan D. Baker

Shoemaker & Mattare
ATTORNEYS

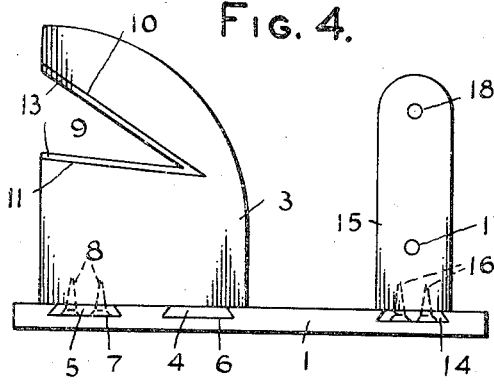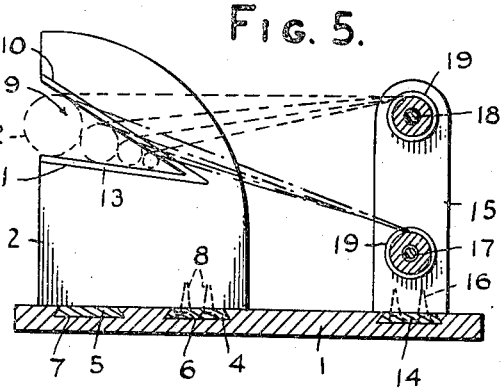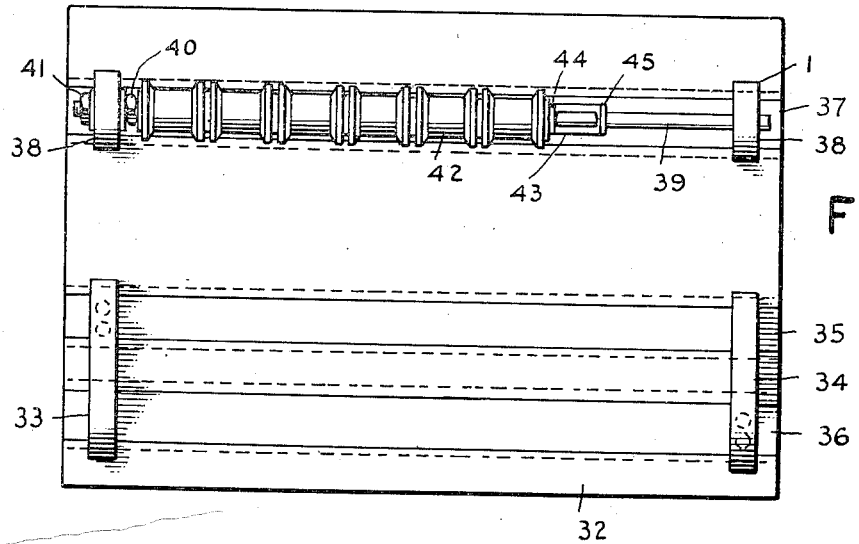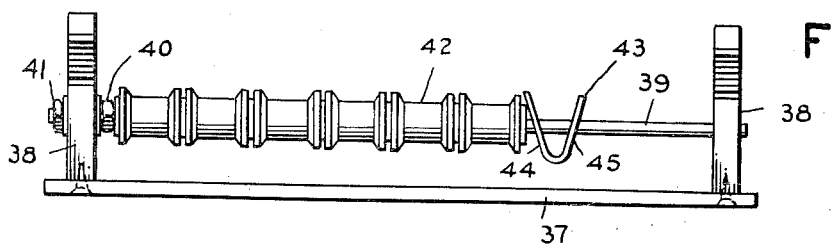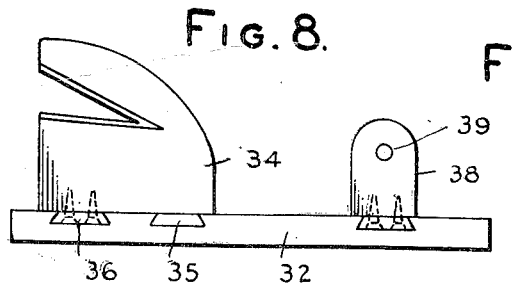

Patented July 5, 1949

2,475,305

UNITED STATES PATENT OFFICE 2,475,305

APPARATUS FOR WRAPPING FISHING RODS AND THE LIKE

Dan D. Baker, New Orleans, La.

Application March 26, 1947, Serial No. 737,338

11 Claims. (Cl. 242—7)

This invention relates to an improved apparatus for applying wrappings to fishing rods and similarly shaped objects.

An object of the invention is to provide an improved apparatus of simple, inexpensive construction by which wrappings of thread, cord or wire can be easily and quickly placed on fishing rods and similarly shaped objects.

Another object of the invention is to provide an improved apparatus of the character referred to so constructed that the rod section to be wrapped can be easily rotated by hand to produce the wrapping without losing tension on the winding strand and the wrapping operation can be stopped at any time, the hands removed from the rod section being wrapped, and the rod section with any unfinished winding can be left in the apparatus without losing tension on the winding strand.

A particularly important novel feature of the invention resides in the special rod holding means provided, comprising a pair of rod holding members arranged in opposing spaced relation and each having a V-shaped recess with opposing continuous straight flat relatively inclined rod engaging surfaces extending outwardly from the apex of the recess and adapted to grip therebetween at different points along the same rod sections of various diameters whereby the various sized sections of fishing rods including the distal end portion of the tip section of a fly rod can be held and wrapped with equal facility without any addition to or change whatever in the opposing continuous straight rod gripping surfaces of the holding members.

The invention, with other objects, advantages, and novel features thereof, and the particular construction, combination and arrangement of parts comprising the same will be understood from the hereinafter contained detailed description, when considered in connection with the accompanying drawings forming part hereof and illustrating two embodiments of the invention.

In the drawings:

Fig. 4 is an end elevation;

Fig. 5 is a transverse section on the line 5—5 of Fig. 2 and illustrating diagrammatically how various size rod sections will be gripped at different points along the opposing relatively inclined surfaces of the rod holding members;

Fig. 6 is a top plan view of a modified form of the device;

Fig. 7 is an end elevation of the spool supporting rack shown in Fig. 6;

Fig. 8 is an end view of the construction shown in Fig. 6; and

Fig. 9 is a detailed perspective view of the spring tensioning member for the spools shown in Fig. 6.

Figure 1:
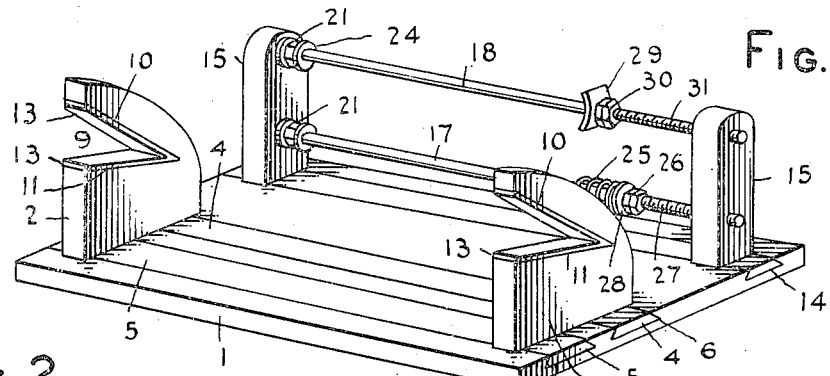
Fig. 1 is a perspective view of an apparatus constructed in accordance with the present invention.

While two preferred embodiments of the invention are illustrated in the drawing, it will be understood that minor changes and modifications may be made in the particular constructions shown and the invention may be embodied in other forms as will appeal to those skilled in the art and falling within the scope of the appended claims without departing from the spirit of the invention.

Figure 2:
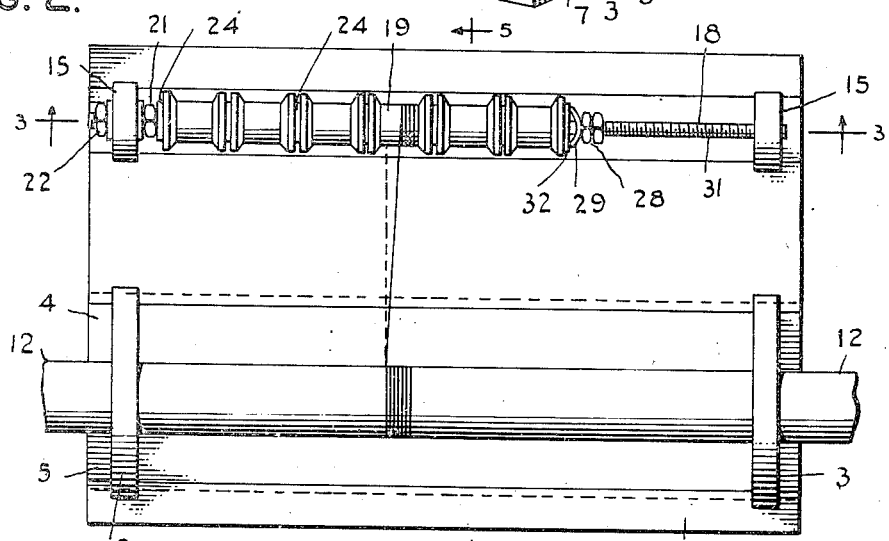
Fig. 2 is a top plan view of the same.
Figure 3:
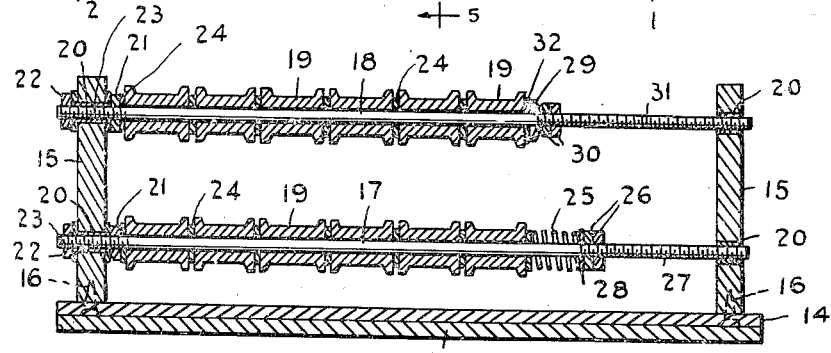
Fig. 3 is a longitudinal vertical section on the line 3—3 of Fig. 2.

Referring to a detailed description of the particular embodiment of the invention illustrated in Figs. 1 to 5 of the drawings, I designates a suitable supporting base for the apparatus. On the supporting base, at the forward part thereof, is a pair of rod holding members 2 and 3 of plate-like form vertically disposed in opposing spaced relation. The rod holding members are mounted for adjustment longitudinally toward and from each other, the same being carried by slides 4 and 5 slidably engaging longitudinally extending grooves 6 and 7 in the upper side of the supporting base I, the slides being shown of dove-tail shape in cross section and the grooves 6 and 7 of corresponding shape. In the particular construction shown, the rod holding members 2 and 3 are formed as separate parts from the slides 4 and 5 and secured thereto by screws 8 or similar fastening means. Each of the rod holding members is provided with a V-shaped recess 9 having opposing continuous straight flat relatively inclined rod engaging surfaces 10 and 11 extending outwardly from the apex of the recess 9 and adapted to grip therebetween, at different points along the same, rod sections of various diameters, said members being adapted to jointly hold a fishing rod section 12 as illustrated in Fig. 2 of the drawings, the area of the rod section that is to be wrapped being disposed substantially midway between the same. The opposing rod engaging surfaces 10 and 11 of each of the rod holding members are provided with linings 13 of cork. The cork linings will not mar the fishing rod sections and they serve to augment the gripping or binding action of the opposed straight converging surfaces of the rod holding members. In place of cork, the linings 13 may be constructed of any other suitable material having like resilient and friction grip-aiding qualities and which will not mar the fishing rod sections. The linings 13 are secured on the surfaces 10 and 11 by any suitable means, for example, as by the use of cement.

On the supporting base 1, rearwardly of the rod holding members is a support or rack for rotatably supporting a plurality of spools of wrapping material, the same being shown as comprising a base member 14, a pair of vertically extending members 15 at opposite ends of the base member 14, secured thereto by screws 16 or equivalent fastening means, and longitudinally extending shafts 17 and 18 extending between and mounted on the end members for rotatably supporting a plurality of spools 19 of wrapping material. The end members 15 of the spool rack are each provided with bearings 20 extending transversely through the same and with which the shafts 17 and 18 are adapted to be engaged by shifting the shafts longitudinally between the end members. Each of the shafts 17 and 18 is provided at one end with means for fixedly securing the same to one of the end members of the spool rack. This is shown as comprising nuts 21 and 22 engaging threaded end portions 23 on the shafts 17 and 18, said nuts being disposed at either side of said end supporting member. As will be understood, by unscrewing the nuts 22, the shafts 17 and 18 can be shifted longitudinally in the bearing 20 on the end member 15, the nuts 21 turned back off the threaded end portions 23 of the shafts and the spools of wrapping material can then be placed on said shafts, this arrangement providing for readily removing spools from the spool rack and the placing of other spools of wrapping material thereon. Numeral 24 designates washer-like spacers or separators between the spools 19, and between the nuts 21 and the adjacent spool. Means is shown associated with the shaft 17 for applying tension to the spools 19 of wrapping material. This comprises a spiral spring member 25 on the shaft, nuts 26 engaging a threaded portion 27 on the shaft, and a washer 28 interposed between the nuts and spring, said spring being adapted to press against the end spool 19 of the plurality of spools on the shaft 17 and apply tension thereto. By adjustment of the nuts 26, as will be understood, the tension on the spools may be varied. On the upper shaft 18, is tensioning means comprising a spring washer 29 and cooperating nuts 30 engaging a threaded portion 31 on the shaft, a washer 32 being interposed between said spring washer 29 and the end spool 19.

The spool support or rack is mounted on the supporting base 1 for longitudinal adjustment so that the same may be adjusted to position any of the spools of wrapping material opposite to a point substantially mid-way of the rod holding members so that any of the various kinds and colors of wrapping material can be conveniently used, as desired, for wrapping the rod sections. The apparatus may be constructed of wood, metal or plastics.

In the use of the apparatus, spools of thread, cord or wire of the desired size and color are placed on the spool rack. The spring tensioning means of the spool rack are adjusted so that the thread, cord or wire may be released smoothly and under moderate tension. The fishing rod, golf club or other article to be partly or wholly covered with windings of thread, cord or wire, is placed in the rod holding members 2 and 3. The area of the rod to be wrapped should be positioned approximately mid-way between the rod holding members so that the hands may be placed on either side of the wrapping. The rod holding members 2 and 3 are moved on the slides until the place on the rod is opposite the proper spool of wrapping material on the spool holding rack or the rod holding members 2 and 3 may remain stationary and the spool supporting rack adjusted longitudinally until the desired spool is in position. Enough thread, cord or wire is released from the spool to start wrapping and pulled over the rod section to be wrapped, then held in place by a small piece of adhesive tape. The wrapping should be started with the thread, cord or wire being released from the spool at an angle of approximately 85° on the side on which the wrapping is to be made so that each of the windings will be caused to lie close to the preceding winding. A loop of thread is covered with several windings so that the loose end may be pulled under the wrappings and so held in place. Before the thread, cord or wire is cut, the thumb should be placed on the winding to prevent a release of the tension. The tension must be maintained until the loop and loose end are pulled under the wrapping. The mounting of the rod holding members for adjustment longitudinally toward and from each other is of advantage in positioning said members to allow space for the hands at each side of the wrapping, and in arranging the area of rod section to be wrapped opposite any of the spools of wrapping material. It also provides for positioning the rod holding members close together when the distal end of the tip section of a fly rod is to be wrapped so that the tension of the thread will not break this portion of the rod as the windings are placed on it.

In the modified form of the apparatus, illustrated in Figs. 6 to 9, the rod holding members are the same as the rod holding members in the construction hereinbefore described and illustrated in Figs. 1 to 5, the only difference being that they are of smaller size, and the spool supporting rack only has a single shaft for supporting spools of wrapping material, this modified construction being especially adapted for use in instances in which the apparatus is only needed for repairing fly rods or bait casting rods. In these views, 32 designates the supporting base for the apparatus, 33 and 34 the rod holding members carried by slides 35 and 36 slidably mounted for longitudinal adjustment in grooves in the upper side of the base. The spool holding rack comprises a base member 37, end members 38 on the base and a longitudinally extending shaft 39 slidably engaging bearings in the end members 38, said shaft being detachably secured to one of the end members 38 by nuts 40 and 41 as in the spool supporting rack illustrated in Fig. 3. In this modified form of the device, the tensioning means for the spools designated 42 comprises a strip of spring metal 43 folded upon itself to form angularly disposed leg portions 44 and 45 each having an aperture 46 to receive the shaft 39, the leg portions 44 and 45 of the spring member when engaged with the shaft, as shown in Fig. 7 of the drawings, tending to spring away from each other, the leg member 44 embracing the shaft to hold the spring member in its adjusted position and the opposite leg member 45 pressing against the end of the adjacent end spool 42, so that tension will be applied to the spools.

By the particular construction and arrangement of parts hereinbefore set forth, an improved apparatus is provided by which wrappings can be easily and quickly placed on all kinds of fishing rods, fly rods, salt water rods or bait casting rods. It may also be used for wrapping other round objects of small size, such as golf clubs. The special rod holding means comprising the pair of rod holding members having a V-shaped recess with opposing continuously straight relatively inclined surfaces extending outwardly from the apex of the recess and adapted to grip therebetween, at different points along the same, rod sections of various diameters, provides for wrapping the various size sections of all kinds of fishing rods with equal facility without any change or adjustment in the opposing gripping surfaces of the rod holding members, and the rod section to be wrapped can be easily rotated by hand to form the wrapping without losing tension on the winding strand. The wrapping operation can be stopped at any time, the hands removed from the rod section being wrapped, and the unfinished winding can be left in the apparatus without loss of tension on the winding strand. The apparatus is simple in construction. It has proven highly satisfactory in use, and can be produced at low cost.

What I claim is:

1. An apparatus for applying wrappings to fishing rods and the like including a support, a pair of rod holding members on said support arranged in opposing spaced parallel relation and one adjustable longitudinally relatively to the other, each of said rod holding members having a V-shaped recess with opposing continuous straight relatively inclined rod engaging surfaces extending outwardly from the apex of the recess and adapted to grip therebetween rod sections of various diameters, a rotatable holder for wrapping material on the support rearwardly of said rod holding members, and means for applying tension to said rotatable wrapping material holder.

2. An apparatus for applying wrappings to fishing rods and the like including a support, a pair of rod holding members on said support arranged in opposing spaced parallel relation and adjustable longitudinally toward and from each other, each of said rod holding members having a V-shaped recess with opposing continuous straight relatively inclined rod engaging surfaces extending outwardly from the apex of the recess and adapted to grip therebetween rod sections of various diameters, a rotatable holder for wrapping material on the support rearwardly of said rod holding members, and means for applying tension to said rotatable wrapping material holder.

3. An apparatus for applying wrappings to fishing rods and the like including a support, a pair of rod holding members arranged in opposing spaced parallel relation on said support, each of said rod holding members having a V-shaped recess with opposing continuous straight flat relatively inclined rod engaging surfaces extending outwardly from the apex of the recess and adapted to grip therebetween at different points along the same rod sections of various diameters, a rotatable wrapping material holder on the support in rear of said rod holding members, said material holder being adjustable longitudinally to different points along the support between the pair of rod holding members, and means for applying tension to said rotatable wrapping material holder.

4. An apparatus for applying wrappings to fishing rods and the like including a supporting base, a pair of rod holding members arranged in opposing spaced parallel relation on said support, each of said rod holding members having a V-shaped recess with opposing continuous straight relatively inclined rod engaging surfaces extending outwardly from the apex of the recess and adapted to grip therebetween at different points along the same, rod sections of various diameters, a longitudinally adjustable spool support on the supporting base in rear of said rod holding members, said spool support including a longitudinally extending shaft adapted to rotatably support thereon a plurality of spools of wrapping material, and means for applying tension to spools on said shaft.

5. An apparatus for applying wrappings to fishing rods and the like including a supporting base, a pair of rod holding members arranged in opposing spaced parallel relation on said supporting base, each of said rod holding members having a V-shaped recess with opposing continuous straight relatively inclined rod engaging surfaces extending outwardly from the apex of the recess and adapted to grip therebetween at different points along the same rod sections of various diameters, said supporting base having a longitudinal groove in the upper side thereof rearwardly of said rod holding members, a spool support including a base member slidably engaging the groove in the supporting base, a pair of vertically extending members on the base member at opposite ends thereof, a longitudinally extending shaft detachably mounted on said vertically extending members and adapted to rotatably support thereon a plurality of spools of wrapping material, and spring means on said shaft for applying tension to a plurality of spools on the same, the base member of said spool support slidably engaging the longitudinal groove in the supporting base for longitudinal adjustment.

6. An apparatus for applying wrappings to fishing rods and the like including a supporting base, a pair of rod holding members arranged in opposing spaced parallel relation on said supporting base, each of said rod holding members having a V-shaped recess with opposing continuous straight relatively inclined rod engaging surfaces extending outwardly from the apex of the recess and adapted to grip therebetween at different points along the same, rod sections of various diameters, a spool support on the supporting base in rear of said rod holding members, said spool support including a longitudinally extending shaft adapted to rotatably support thereon a plurality of spools of wrapping material, and means for applying tension to spools on said shaft, said means including a spring plate member having a pair of leg portions apertured to fit upon the shaft and adjustably engaging same, one of said leg portions being adapted to press against one end of one of said spools.

7. An apparatus for applying wrappings to fishing rods and the like including a supporting base having a pair of longitudinally extending grooves in the upper side thereof, a pair of rod holders arranged in opposing spaced parallel relation and adjustable toward and from each other, each rod holder including a base member slidably engaging one of said longitudinal grooves in the supporting base, and a vertically extending member of flat plate-like form on said base member, the vertically extending members of the rod holders each having a V-shaped recess providing opposing continuous straight relatively inclined rod engaging surfaces extending outwardly from the apex of the recess and adapted to grip therebetween rod sections of various diameters, a rotatable holder for wrapping material on the supporting base rearwardly of said rod holders, and means for applying tension to said rotatable wrapping material holder.

8. An apparatus for applying wrappings to fishing rods and the like including a supporting base, a pair of rod holding members on said base arranged in opposing spaced parallel relation on said supporting base, each of said rod holding members having a V-shaped recess with opposing continuous straight relatively inclined rod engaging surfaces extending outwardly from the apex of the recess and adapted to grip therebetween rod sections of various diameters, a spool support on said base rearwardly of said pair of rod holding members, said spool support including a pair of vertical standards arranged in opposing spaced relation each provided with a tubular bearing, a shaft adapted to be engaged with said bearings to extend horizontally therebetween and rotatably support a plurality of spools of wrapping material, said shaft being engageable with and disengageable from said bearings by shifting the same longitudinally between said standards, and means for detachably securing one end of said shaft to one of said vertical standards, and means for applying tension to a plurality of spools on said shaft.

9. An apparatus for applying wrappings to fishing rods and the like including a supporting base, a pair of rod holding members on said base arranged in opposing spaced parallel relation on said supporting base, each of said rod holding members having a V-shaped recess with opposing continuous straight relatively inclined rod engaging surfaces extending outwardly from the apex of the recess and adapted to grip therebetween rod sections of various diameters, a spool support on said base rearwardly of said pair of rod holding members, said spool support including a pair of vertical standards arranged in opposing spaced relation each provided with a tubular bearing, a shaft adapted to be engaged with said bearings to extend horizontally therebetween and rotatably support a plurality of spools of wrapping material, said shaft being engageable with and disengageable from said bearings by shifting the same longitudinally between said standards, and means for detachably securing one end of said shaft to one of said vertical standards, and means carried by said shaft for applying tension to a plurality of spools mounted thereon.

10. An apparatus for applying wrappings to fishing rods and the like including a supporting base, a pair of rod holding members on said base arranged in opposing spaced parallel relation on said supporting base, each of said rod holding members having a V-shaped recess with opposing continuous straight relatively inclined rod engaging surfaces extending outwardly from the apex of the recess and adapted to grip therebetween rod sections of various diameters, a spool support on said base rearwardly of said pair of rod holding members, said spool support including a pair of vertical standards arranged in opposing spaced relation each provided with a tubular bearing, a shaft adapted to be engaged with said bearings to extend horizontally therebetween and rotatably support a plurality of spools of wrapping material, said shaft being engageable with and disengageable from said bearings by shifting the same longitudinally between said standards, and means for detachably securing one end of said shaft to one of said vertical standards, and means for applying tension to a plurality of spools on said shaft, said means comprising a spring member carried by the shaft, and a nut engaging a threaded portion on the shaft at one side of said spring member and adapted to press the same against one end of a spool of wrapping material on the shaft.

11. An apparatus for applying wrappings to fishing rods and the like including a supporting base, a pair of vertically extending rod holding members on said supporting base arranged in opposing spaced parallel relation and each having a V-shaped recess with opposing continuous straight rod engaging surfaces extending outwardly from the apex of the recess at an acute angle to each other and adapted to grip therebetween rod sections of various diameters, the said recesses extending inwardly from the front of the rod holding members, and the lower rod engaging surface of each of said recesses extending at a downward inclination toward the apex of the recess, means for supporting a wrapping strand rearwardly of and at a point between said rod holding members, and means for applying tension to said wrapping strand.

DAN D. BAKER.

REFERENCES CITED

The following references are of record in the file of this patent:

UNITED STATES PATENTS

| Number | Name | Date |
|---|---|---|
| 464,279 | Fraser | Dec. 1, 1891 |

FOREIGN PATENTS

| Number | Country | Date |
|---|---|---|
| 40,596 | France | July 27, 1932 |